United States Patent [19]
Tateyama

[11] Patent Number: 5,844,813
[45] Date of Patent: Dec. 1, 1998

[54] INFORMATION PROCESSING APPARATUS AND METHOD WITH SETTING OF POWER OFF STATE AND WITH RECOGNITION OF PRINTER OPERATING STATE

[75] Inventor: Jiro Tateyama, Yokohama, Japan

[73] Assignee: Canon Kabushiki Kaisha, Tokyo, Japan

[21] Appl. No.: 766,693

[22] Filed: Dec. 13, 1996

Related U.S. Application Data

[63] Continuation of Ser. No. 208,411, Mar. 10, 1994, abandoned.

[30] Foreign Application Priority Data

Mar. 12, 1993 [JP] Japan ................................ 5-052232
Feb. 24, 1994 [JP] Japan ................................ 6-026814

[51] Int. Cl.$^6$ ........................................................ G06F 1/32
[52] U.S. Cl. .......................... 364/528.3; 364/528.32; 364/707; 395/113; 395/750.03; 395/750.07; 395/750.08
[58] Field of Search ................................. 364/483, 707, 364/142, 492, 493, 132, 138, 141, 480, 514 R, 710.13; 395/750, 113–115, 112, 750.01–750.08; 346/9, 50–52, 150.1, 33 R; 347/1–3, 5, 23, 57; 400/663, 664; 307/125, 126, 116; 340/825.06, 17, 0.55

[56] References Cited

U.S. PATENT DOCUMENTS

| | | | |
|---|---|---|---|
| 4,740,096 | 4/1988 | Nakanishi | 400/663 |
| 5,163,153 | 11/1992 | Cole et al. | 395/750 |
| 5,262,872 | 11/1993 | Yoshimura et al. | 347/2 |
| 5,339,446 | 8/1994 | Yamasaki et al. | 395/750 |
| 5,347,167 | 9/1994 | Singh | 364/493 |
| 5,355,501 | 10/1994 | Gross et al. | 364/707 |
| 5,382,969 | 1/1995 | Mochizuki et al. | 347/23 |
| 5,396,443 | 3/1995 | Mere et al. | 364/707 |
| 5,410,713 | 4/1995 | White et al. | 364/707 |
| 5,420,667 | 5/1995 | Kaneko et al. | 395/113 |
| 5,425,135 | 6/1995 | Motoyama et al. | 395/114 |
| 5,430,881 | 7/1995 | Iheda | 364/707 |
| 5,471,322 | 11/1995 | Murata | 347/3 |
| 5,485,178 | 1/1996 | Tateyama et al. | 347/5 |
| 5,546,591 | 8/1996 | Wurzburg et al. | 364/707 |
| 5,581,668 | 12/1996 | Oida et al. | 395/113 |

*Primary Examiner*—Emanuel Todd Voeltz
*Assistant Examiner*—Hal D. Wachsman
*Attorney, Agent, or Firm*—Fitzpatrick, Cella, Harper & Scinto

[57] ABSTRACT

An information processing apparatus includes an information processing unit power saving controller for controlling a power saving function of an information control unit for controlling various devices, and a printer unit power saving controller for controlling a power saving function of a printer unit for performing a print operation. The printer unit power saving controller controls the power saving function of the printer unit on the basis of a predetermined command from the information processing unit power saving controller.

11 Claims, 20 Drawing Sheets

FIG. 5

| ADDRESS | DEVICE |
|---|---|
| 0000H-001FH | DMA CONTROLLER 1 |
| 0020H-0021H | INTR CONTROLLER 1 |
| 0040H-0043H | SYSTEM TIMER |
| 0060H-0064H | KB |
| 0070H-0071H | REAL TIME CLOCK, NMI MASK |
| 0080H-008FH | DMA BANK REGISTER |
| 00A0H-00A1H | RESERVED |
| 00C0H-00DFH | RESERVED |
| 00F0H-00FFH | FPU |
| 01F0H-01FFH | HD CONTROLLER |
| 0200H-0207H | RESERVED |
| * 0278H-027FH | PARALLEL PORT 3 |
| 02F8H-02FFH | SERIAL PORT 2 |
| 0300H-031FH | RESERVED |
| 0360H-036FH | RESERVED |
| 0370H-0377H | RESERVED |
| * 0378H-037FH | PARALLEL PORT 2 |
| 0380H-03AFH | RESERVED |
| 03B0H-03BBH | VIDEO CONTROLLER |
| * 03BCH-03BFH | PARALLEL PORT 1 |
| 03C0H-03DFH | VIDEO CONTROLLER |
| 03E0H-03EFH | RESERVED |
| 03F0H-03F7H | FD CONTROLLER |
| 03F8H-03FFH | SERIAL PORT 1 |
| * 0100H-0107H | SET UP REGISTER (SET/IO) |
| * PSP BASE ADDRESS | PRINTER STATUS PORT (PST/IO) |

PIF/IO REGISTER

PFM/IO REGISTER

INFORMATION PROCESSING APPARATUS AND METHOD WITH SETTING OF POWER OFF STATE AND WITH RECOGNITION OF PRINTER OPERATING STATE

This application is a continuation of application Ser. No. 08/208,411, filed Mar. 10, 1994, now abandoned.

BACKGROUND OF THE INVENTION

1. Field of the Invention

The present invention relates to an information processing apparatus and method, in which information processing means and print control means are connected through a common bus.

2. Related Background Art

Conventionally, in a personal computer as an information processing apparatus, when a document created by an application software program such as a wordprocessor is to be printed, an interface cable is used to connect a parallel port connector of the personal computer to an external printer as a print processing apparatus, and print data and commands are sent to the printer via a parallel interface so as to perform a print operation.

When application programs are selectively used in the personal computer, if the types of printer emulation modes must be switched in units of application programs, an exclusive special command is prepared, and a change command is supplied from the parallel port to the printer.

However, in a system which separately includes a personal computer main body and a printer, print data and commands are transferred to the external printer by connecting the cable between the parallel port connector of the personal computer main body and the printer. For this reason, even when the data transfer rate is to be increased, the rise and fall times of transfer signals increase due to the resistance and capacitance components of the cable itself, and the data transfer rate cannot be increased beyond a predetermined rate.

In a personal computer having a power saving function, if an external printer is kept connected to the personal computer, a leak current flows through the parallel port. For this reason, when the computer is kept connected to the printer, and is continuously driven by a battery, an operation for a long period of time cannot be performed.

Thus, a printer may be assembled in a personal computer main body to directly connect a host computer unit and the parallel port of a printer unit so as to eliminate the influence of a cable. However, in a portable personal computer, even when the printer unit is assembled, the number of components to be mounted must be minimized.

More specifically, when parallel interface circuits are respectively provided to the host computer unit and the printer unit, and a driving control circuit for the printer unit and a power saving control circuit of an interface control circuit are separately arranged, the number of components is undesirably increased.

On the other hand, when an emulation mode of a printer is switched by an exclusive special command, since the special command is transferred to an external printer upon being added to a normal print command, versatility of a printer command is impaired.

SUMMARY OF THE INVENTION

The present invention has been made in consideration of the above-mentioned problems, and has as its object to provide an information processing apparatus, in which a parallel I/F port (PIO/IO) is set in one of I/O ports indicated by parallel ports 1 to 3 of a host computer unit as a means for sending print data and commands from the host computer unit to the printer unit in a portable personal computer incorporating a printer, so that the internal printer unit connected to an internal bus of the host computer unit can perform data transfer with parallel interface versatility like in a case wherein print data and commands are transferred to an external printer connected to an external parallel port connector.

It is another object of the present invention to provide an information processing apparatus which allows a host computer unit to set a printer emulation mode and to change setting information of each emulation mode and also allows a printer unit to indicate a printer operation state and an emulation hand-shake state via a register (PST/IO) which can directly exchange information between the host computer unit and the printer unit.

It is still another object of the present invention to provide an information processing apparatus which can save power consumption even in a system as a combination of a personal computer and a printer unit by providing an independent power saving control unit to the printer unit in addition to a power saving control unit of the personal computer.

It is still another object of the present invention to provide an information processing apparatus, in which a print control function, an interface control function, and a printer power saving control function are realized by one independent unit in an internal printer unit assembled in a personal computer, so that a space for components in a system as a combination of a host computer unit and the printer unit can be saved.

BRIEF DESCRIPTION OF THE DRAWINGS

FIG. 5 shows the I/O address map of a host unit;

DETAILED DESCRIPTION OF THE PREFERRED EMBODIMENTS

Figure 1:
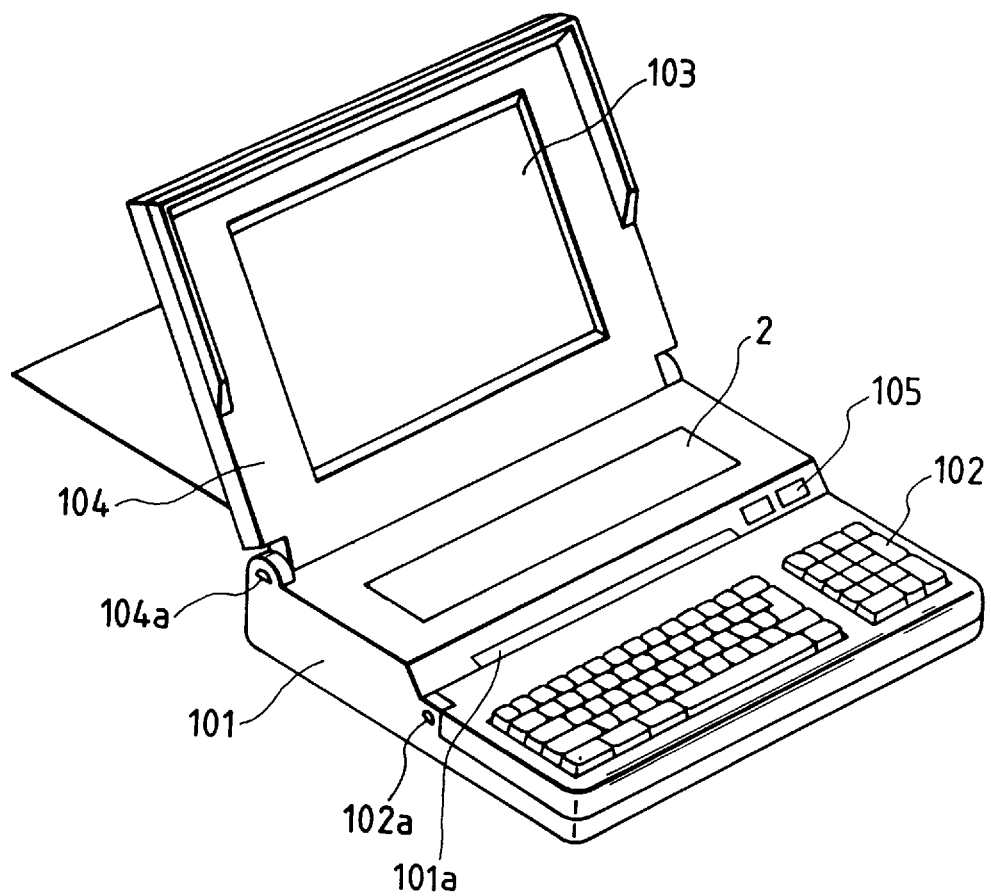
FIG. 1 is a perspective view showing a personal computer to which the present invention is applied.

FIG. 1 is a perspective view showing a personal computer which integrates a host computer unit and a printer unit according to an embodiment of the present invention.

A personal computer 1 is constituted by a computer main body 101, a keyboard 102, a display unit 103, and a printer unit 2 which uses an ink-jet recording head as an example of print devices.

An upper cover 104 is pivotally attached to the computer main body 101 via hinges 104a which are formed at the two ends of the rear edge of the computer main body 101.

When the computer of this embodiment is used, the upper cover 104 is pivoted and opened to a position where the display unit 103 is easy to see. When the computer is not used, the upper cover 104 is closed, and serves as a cover.

A display element of the display unit 103 as an example of devices comprises a liquid crystal display element (LCD) since the display unit can have a low profile.

An operation switch 105 is used for operating a printer (e.g., for a paper feed operation, an on-line switching operation, and the like).

The printer unit 2 has an opening portion which can be opened/closed by an operator, and which allows exchange of a recording head.

A recording paper sheet 3 is inserted from a paper feed port 101a formed in the lower portion of the printer unit 2, is conveyed in a convey path extending through the computer main body 101, and is exhausted from a paper exhaust port formed in the rear portion of the computer.

The keyboard 102 is pivotally attached via hinges 102a formed at the two sides of the computer main body 101.

Figure 2:
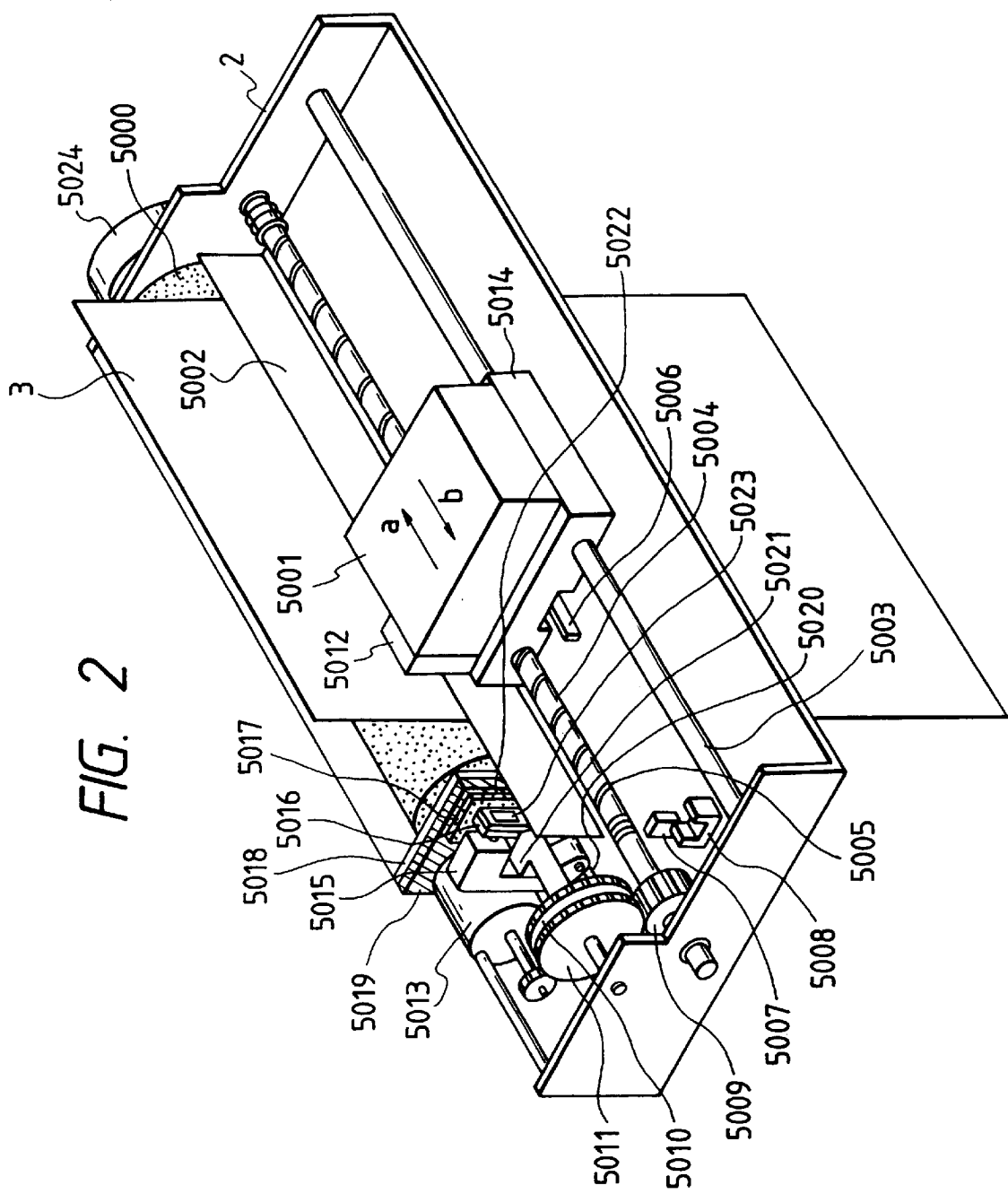
FIG. 2 is a perspective view of a printer unit.

FIG. 2 is a perspective view showing the arrangement of the printer unit 2 which adopts an ink-jet recording system.

A recording head 5012 constitutes an exchangeable integrated cartridge together with an ink tank 5001. The integrated cartridge is attached to the printer main body via a carriage 5014, which is arranged in the computer main body, so that an ink flies downward in the computer main body 101. A guide 5003 scans the carriage in the sub-scanning direction.

A platen roller 5000 scans the recording paper sheet 3 in the main scanning direction. A feed motor (FM) 5024 pivots the platen roller. A paper pressing plate 5002 presses the recording paper sheet 3 against the platen roller 5000.

The carriage 5014 is coupled to a spiral groove 5005 of a lead screw 5004, which is rotated via driving force transmission gears 5009 and 5011 in synchronism with the forward/reverse rotation of a carriage driving motor (CM) 5013. The carriage 5014 has a pin, and is reciprocally moved in directions of arrows a and b.

Position sensors 5007 and 5008 serve as home position (HP) detection means for confirming the current position of the carriage, and are used for controlling the switching operation of the rotational direction of motors.

A member 5016 supports a cap member for capping the front surface of the recording head. A cleaning means 5015 for drawing the interior of the cap by suction performs an ink suction operation (head cleaning operation) of the recording head via an intra-cap opening portion 5023.

A cleaning blade 5017 is movable in the back-and-forth direction of the computer main body by a member 5019, and these members are supported on a main body support plate 5018.

A lever 5021 is used for starting a suction operation in a suction recovery mode, and moves upon movement of a cam coupled to the carriage. The movement of the lever 5021 is controlled by a driving force from a driving motor via a transmission means such as a clutch switching means.

These capping, cleaning, and suction recovery operations are desirably performed at their corresponding positions upon operation of the lead screw when the carriage reaches a home position region. Also, since the recording head is arranged so that an ink drops downward with respect to the computer main body, an influence on the ink dropped by gravity can be avoided.

Figure 3:
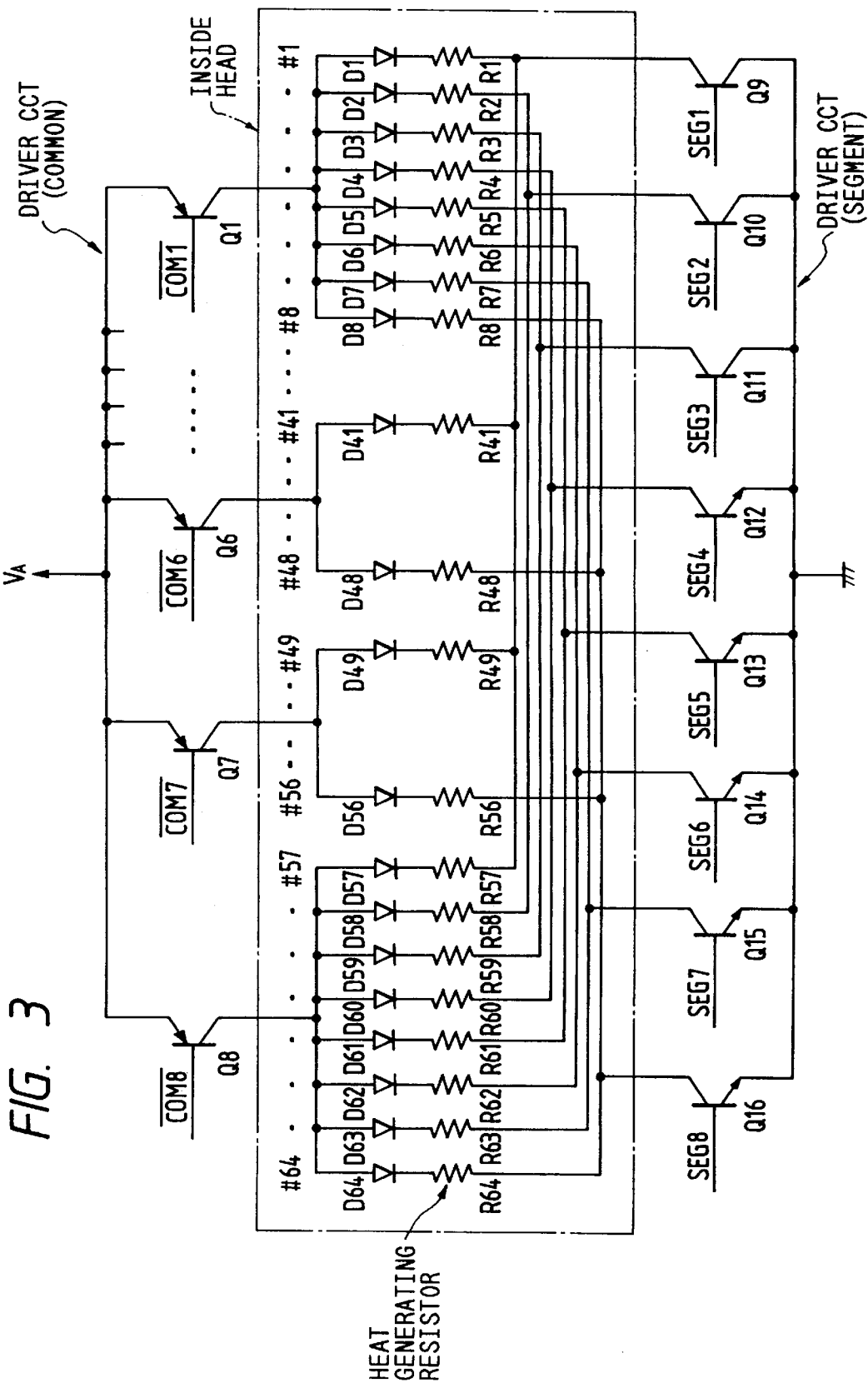
FIG. 3 is a circuit diagram of the electrical arrangement of a recording head and a head driver.

FIG. 3 is a circuit diagram showing the arrangement of the recording head and a head driver circuit of the printer unit 2.

In this embodiment, an ejection unit has 64 ejection orifices, and #1 to #64 are numbers corresponding to the positions of the ejection orifices provided to the ejection unit.

Heat generating resistors R1 to R64 are ink ejection energy generating elements arranged in correspondence with the ejection orifices #1 to #64.

The heat generating resistors R1 to R64 are divided into blocks each including eight resistors, and the resistors in each block are commonly connected to a corresponding one of switching transistors Q1 to Q8 of a common driver circuit. These transistors Q1 to Q8 respectively switch energization paths in accordance with the ON-OFF states of control signals COM1 to COM8.

Reverse-flow prevention diodes D1 to D64 are respectively arranged in the energization paths to the heat generating resistors R1 to R64.

Transistors Q9 to Q16 for turning on/off a segment driver circuit are connected to the heat generating resistors arranged at corresponding positions in the blocks, and respectively switch the energization paths to the heat generating resistors in accordance with the ON-OFF states of control signals SEG1 to SEG8.

As described above, upon combinations of the signals COM and SEG, 64-dot ink ejection control is realized.

Figure 4:
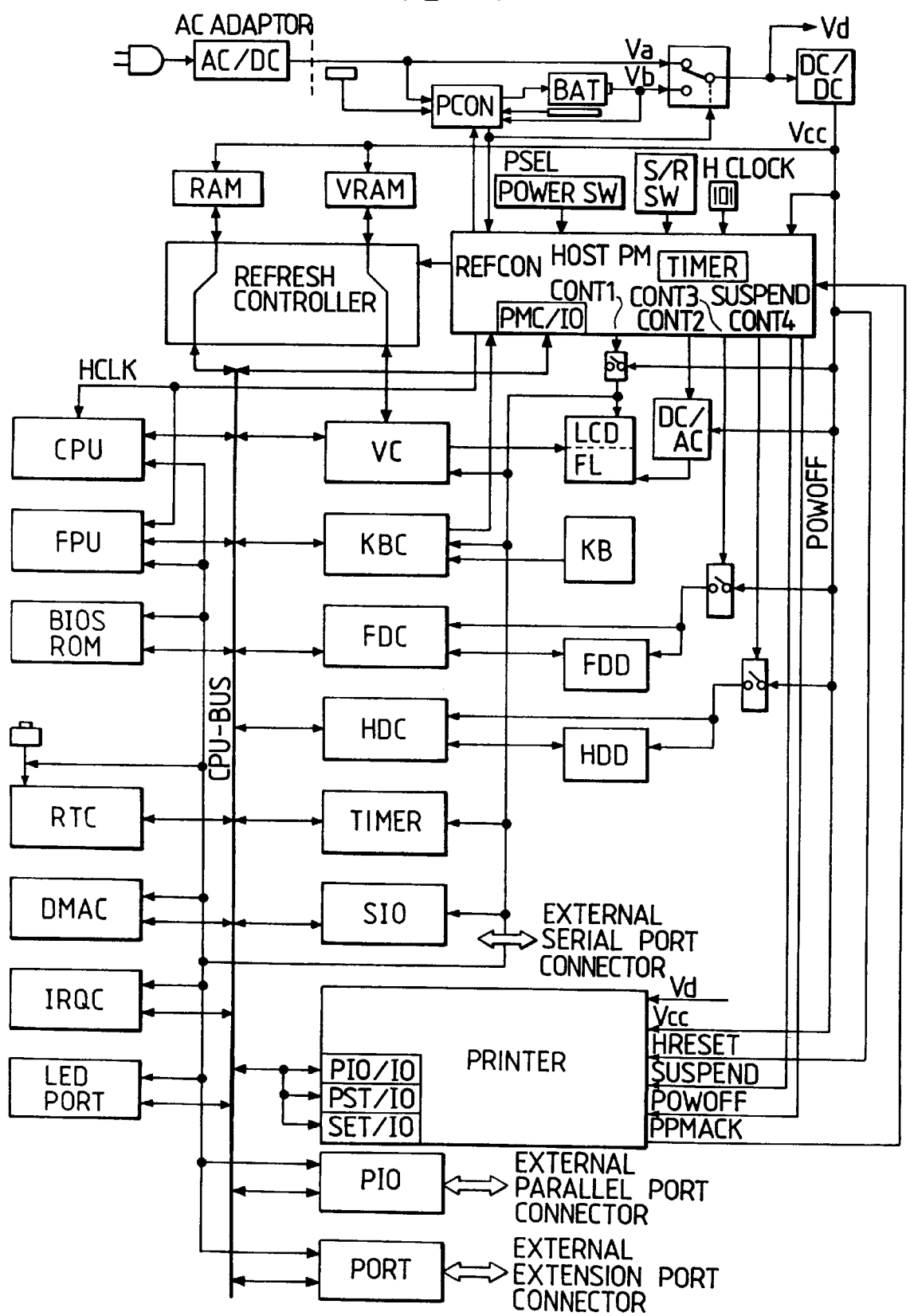
FIG. 4 is a schematic block diagram of the personal computer.

FIG. 4 is a schematic block diagram showing the internal arrangement of the personal computer.

A central processing unit (CPU) performs main control in a host unit, and a BIOS instructs basic control of the CPU.

A numeric operation processor (FPU) is connected to a CPU-bus, and is used for extending arithmetic operation commands for a floating point calculation, a logarithmic calculation, and the like.

An application program, a data file, and the like are read out from a floppy disk drive (FDD) or a hard disk drive (HDD) via a floppy disk controller (FDC) or a hard disk controller (HDC), and the readout program is executed by utilizing a system memory (RAM).

At this time, as a screen display method, character data, graphic data, and the like are displayed on a liquid crystal display (LCD) via a video controller and a display memory (VRAM). Key inputs from a keyboard (KB) are fetched via a keyboard controller (KBC).

A real-time clock (RTC) is a timer indicating the current time, and is operated by an exclusive battery even when the main power supply of the entire system is turned off.

A DMA controller (DMAC) performs data transfer between two memories or between a memory and an I/O without going through the CPU.

An interrupt controller (IRQC) receives an interrupt from each I/O, and executes processing in accordance with the priority order.

A system timer (TIMER) has free running timers of several channels, and performs various kinds of time management.

In addition, a serial port (SIO), a parallel port (PIO), and an extension port (PORT) are port blocks to be connected to external connectors.

An output device (LEDport) is used for informing, e.g., an operating state to a user.

The printer unit in this embodiment is directly connected to the host unit via the CPU-bus, and can exchange information with the host unit via a register.

In addition to the above-mentioned control functions of a normal personal computer, a portable personal computer must have functions corresponding to two different power supplies, i.e., an AC adapter (AC/DC) and a battery (BAT), and in particular, must have a power saving control function when the battery is used.

Thus, a host power management unit (host PM unit) is arranged as a power saving circuit. The host PM unit performs systematic power saving control of the personal computer, i.e., controls an ON-OFF switching signal (CONT2) for a DC/AC inverter circuit of a cold-cathode tube (FL) used as a back light of the LCD, a power supply signal (CONT3) to the FDD, a power supply signal (CONT4) to the HDD, power supply signals (CONT1) to devices other than the RAM and VRAM, a suspend request signal (SUSPEND) and a reset request signal (HRESET) to the printer unit, a CLOCK supply control signal (Hclock/HCLK) to the CPU, and the like, in accordance with information set by a suspend/resume selection switch (S/R-SW) and a PMC/IO register.

More specifically, the printer unit performs independent power saving control (suspend/resume) upon reception of a power saving control signal (SUSPEND) from the host PM unit or by confirming that no data is input from the host unit for a predetermined period of time.

Note that the signal SUSPEND from the host PM unit requests the start of a suspend mode at its leading edge, and requests the start of a resume mode at its trailing edge. When the main power supply of the host unit is turned on/off by a POWER SW, the host PM unit and the printer unit exchange a signal POWOFF indicating a power-OFF request to the printer unit, and a signal PMMACK indicating an acknowledge of the printer signal to the signal POWOFF.

Furthermore, a refresh controller is also arranged as the power saving circuit. The refresh controller switches the RAM and VRAM which comprise dynamic RAMs between a suspend state in which the CPU is not active, and a resume state in which the CPU is active, in accordance with an instruction signal (REFCON) from the host PM unit, and generates a D-RAM refresh signal.

A power controller (PCON) is arranged as a power control function block. Based on a detection mechanism for detecting insertion/removal of the connector of the AC connector and loading of the battery, the power controller generates a switching control signal (PSEL) for, when a power supply voltage (Va) is supplied from the AC adapter, connecting the main power supply (Vd) to the power supply Va, and for, when power supply from the AC adapter is stopped, connecting a power supply voltage (Vb) from the battery to the main power supply (Vd). The power controller has a charge circuit for performing charge control upon detection of the output voltage (Vb) from the battery.

FIG. 5 shows the address map of the respective I/Os of the host unit in this embodiment.

I/O ports shown in FIG. 5 perform data exchange (READ/WRITE) via ports at addresses set by hardware. For example, the I/O ports of the keyboard will be exemplified below. Data exchange between the keyboard and the keyboard controller is performed using an I/O port allocated at addresses 60H to 64H. The CPU can detect information of a depressed key by reading a key data reception port in the I/O port.

A parallel I/F port (PIO/IO) is a register used for sending print data and commands from the host unit to the printer unit. When the parallel I/F port (PIO/IO) is set in one of I/O ports indicated by parallel ports 1 to 3 as versatile parallel ports, print data and commands can be sent to the printer unit connected to the CPU-bus.

More specifically, when print data and commands are transferred via the PIO/IO register of the printer unit, the internal printer unit can be used in the same manner as in a case wherein print data and commands are sent in a system constituted by connecting an external printer to a parallel port connector of a personal computer.

A setup register (SET/IO) at addresses 100H to 107H is used for setting the ports of the printer unit. More specifically, the setup register is used for setting the parallel I/F port (PIO/IO) in one of parallel ports 1 to 3, and setting the I/O address of a printer status port (PST/IO).

The printer status port (PST/IO) is a register for exchanging status information and emulation setting information between the printer unit and the host unit.

Figure 6A:
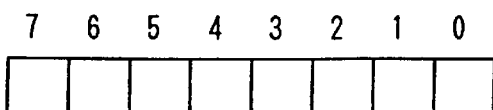
FIG. 6A–6C are views showing the arrangement of a SET/IO register.
Figure 6B:
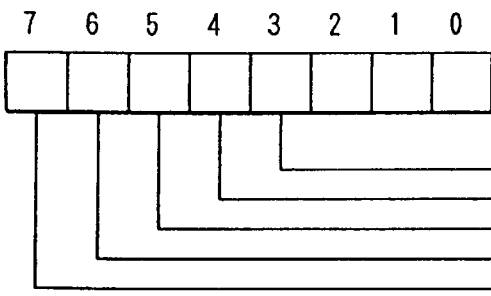
Figure 6C:
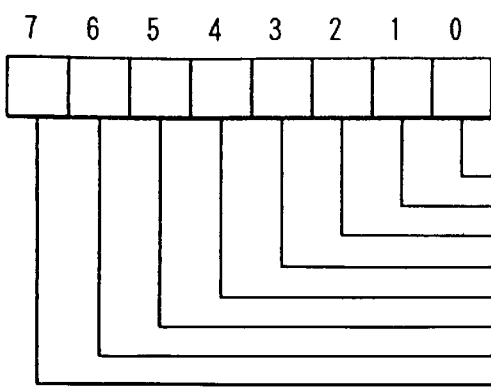

FIGS. 6A through 6C shows the arrangement of the setup register (SET/IO).

Setup register 2, shown in FIG. 6A, at address 102H is constituted by an enable bit of the port PST/IO, an enable bit of the port PIO/IO and an address selector bit of the port PIO/IO. This register allows an access from the host computer when the two enable bits are "1". The address selector bit is a bit for setting the port PIO/IO in one of parallel ports 1 to 3.

Registers at 103H and 104H shown in FIGS. 6B and 6C, respectively, are used for setting the I/O addresses of the port PST/IO. Each of these registers allows continuous 8 bytes from the set address to be used as a bidirectional register for exchanging status information and emulation setting information between the host unit and the printer unit.

Figure 7:
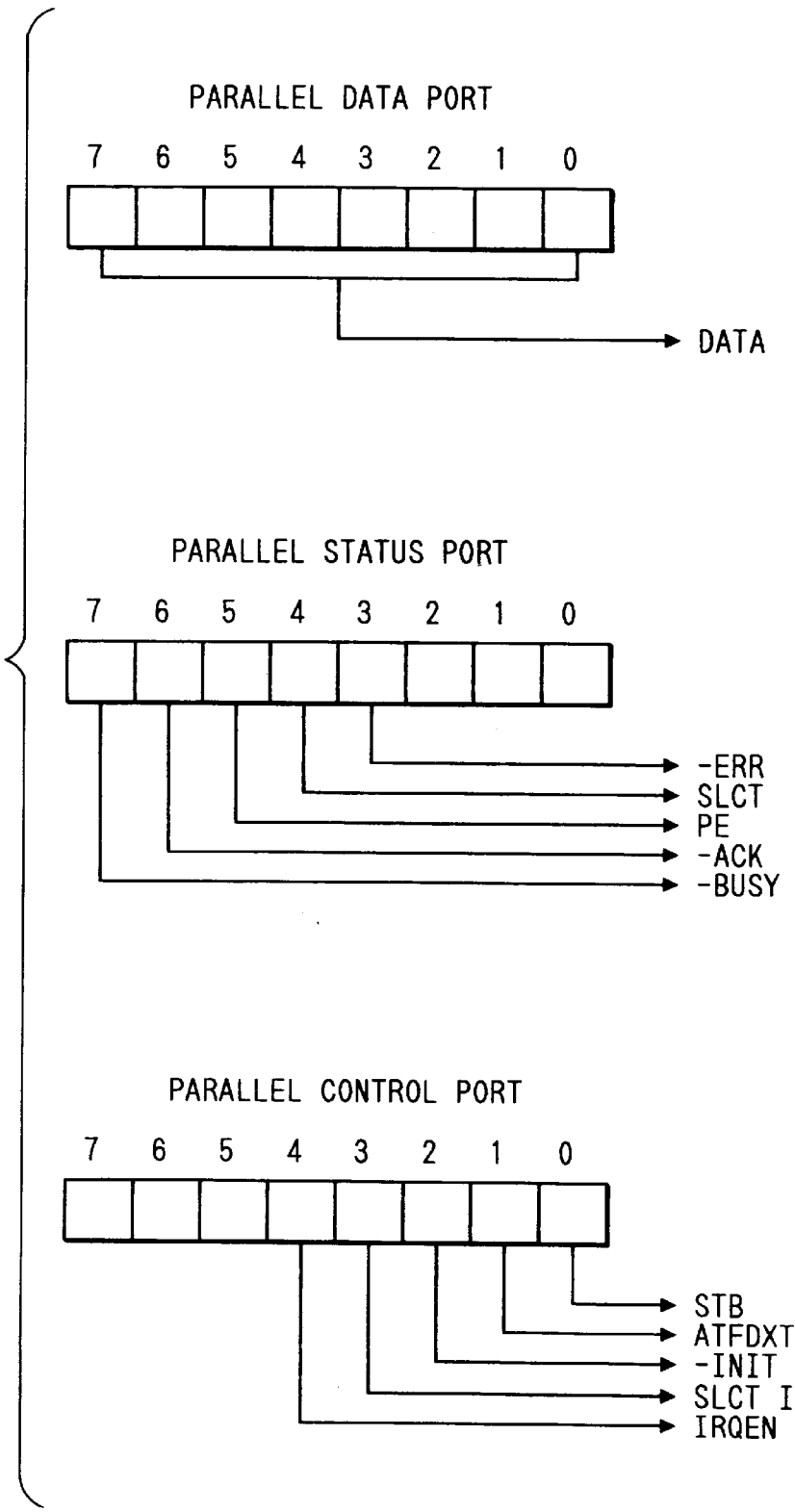
FIG. 7 is a view showing the arrangement of a PIO/IO register.

FIG. 7 shows the arrangement of the parallel I/F port (PIO/IO).

The port PIO/IO is a versatile parallel port, and is constituted by 3 bytes, i.e., a data port, a status port, and a control port. The port PIO/IO transfers data by hand-shaking of data in units of bytes between the host unit and the printer unit.

The parallel data port is a register in which parallel data to be transferred is written. The host unit can write data in this port.

The parallel status port is a register for informing the operation state of the printer. The host unit can make only a read access to this port.

The respective bits of the parallel status port will be described below. A -BUSY bit is a Data Busy Bit which indicates that it is impossible to perform data reception at the printer side (busy state) when it is "0", and indicates that it is possible to perform data reception when it is "1".

A -ACK bit is an Acknowledge Bit indicating that data reception processing at the printer side is completed when it is "0".

A PE bit is a Paper Empty Bit indicating that paper sheets are used up when it is "1".

An SLCT bit is a Select Bit which outputs "1" when the printer is selected.

A -ERR bit is a Printer Error Condition Bit for informing a printer error when it becomes "0".

The parallel control port is a register which allows a read/write access in accordance with a control signal from the host side upon data transfer.

The respective bits of the parallel control port will be described below. An IRQEN bit is an IRQ Enable Bit for generating an IRQ (interrupt signal) synchronized with a signal -ACK when it is "1".

An SLCTIN bit is a Select In Bit for invalidating a CD1/DC3 code when it is "1" in an initial state of the printer.

A -INIT bit is an Initialize Printer Bit for initializing the printer when it is set to "0".

An ATFDXT bit is an Automatic Feed XT Bit for automatically feeding a paper sheet upon input of a CR code when it is set to "1" in an initial state of the printer.

An STB bit is a Strobe Bit for reading data, and transfer data is fetched when this bit changes from "1" to "0".

FIGS. 8A–8D is a timing chart of data transfer in the versatile parallel interface.

The control flow of data transfer at the host side is as follows. That is, after it is confirmed that the -BUSY bit (FIG. 8C) is not "0", data is written at bits DATA (FIG. 8A), and is fetched by the printer when the STB bit is changed from "1" to "0".

Figure 8:
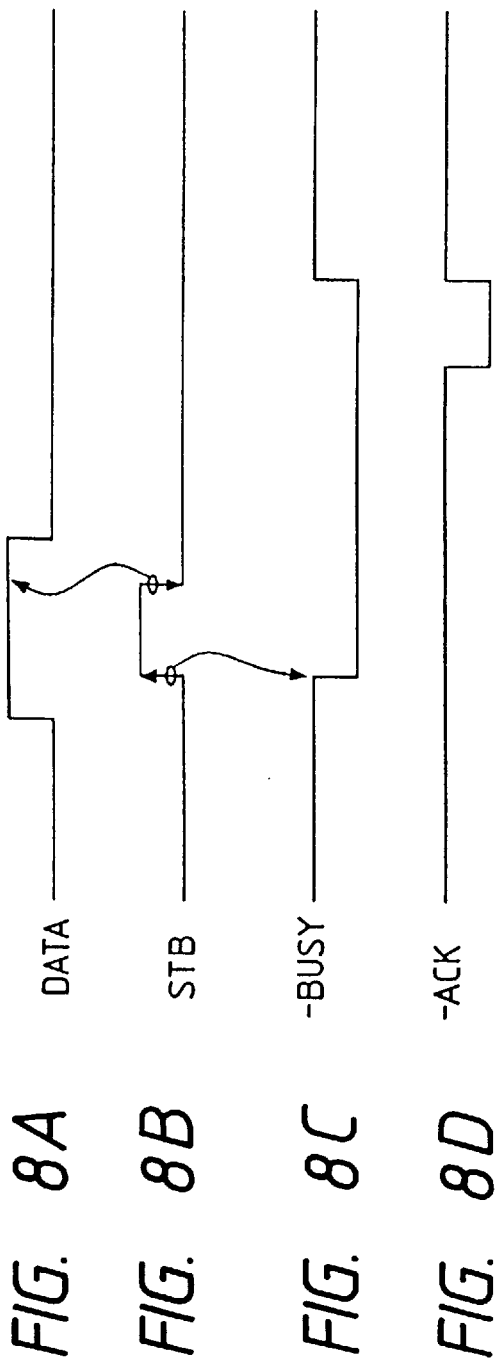
FIG. 8A–8D are timing charts of data transfer.

The -BUSY bit is set to "0" (active) when the STB bit (FIG. 8B) is set to "1", and upon completion of the data fetching operation at the printer side, the -BUSY bit is restored to "1". At this time, a one-shot pulse is generated in the -ACK bit (FIG. 8D).

Upon repetition of this control flow, data and commands for a print operation are sequentially transferred from the host unit to the printer unit.

Figure 9:
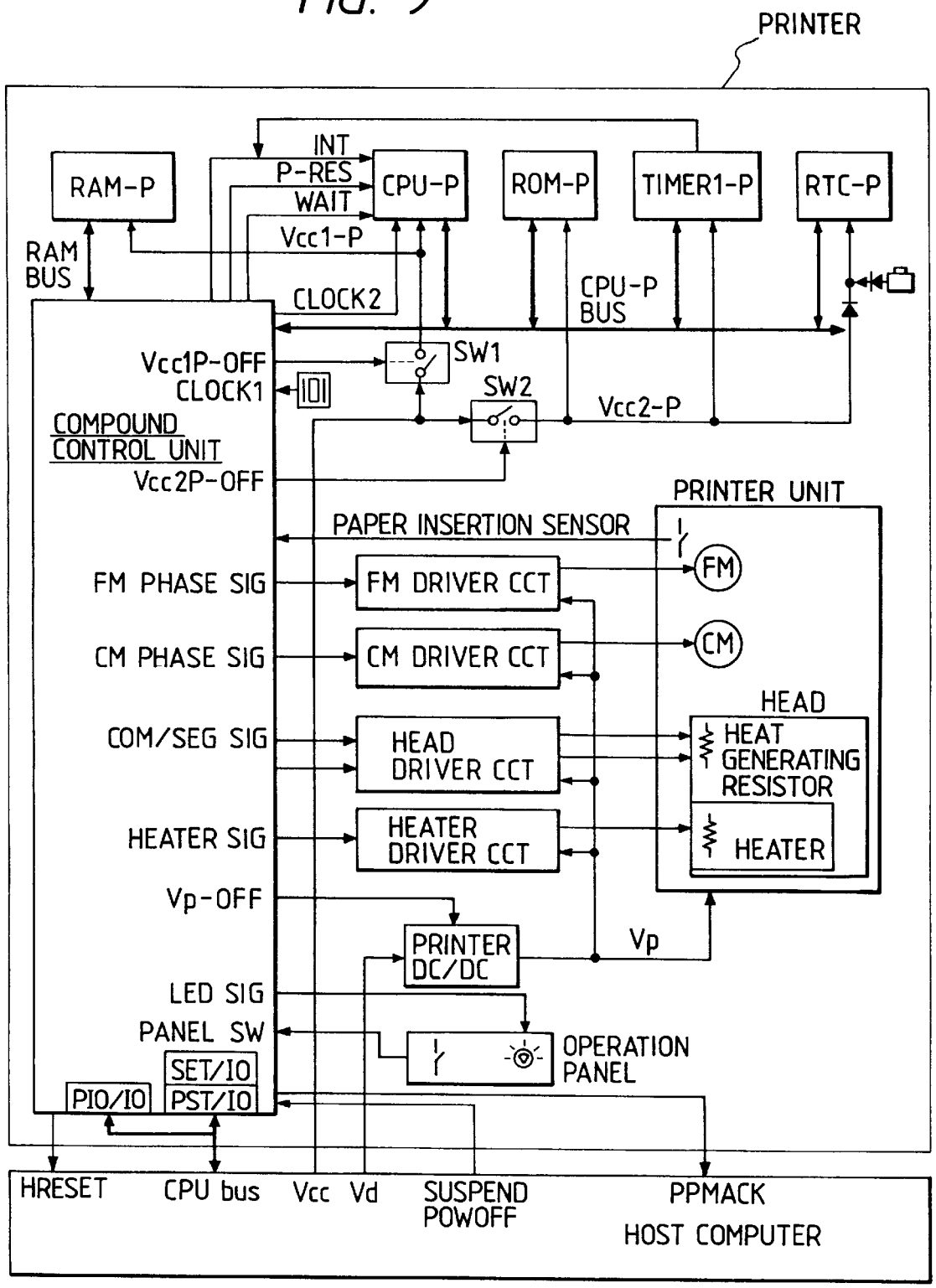
FIG. 9 is a block diagram of a printer unit control system.

FIG. 9 is a block diagram showing the arrangement of the printer unit.

A microprocessor (CPU-P) performs main control of the printer unit. The CPU-P exchanges status information and emulation setting information between the host unit and the printer unit via a printer control & status port unit in a compound control unit (to be described later). Also, the CPU-P fetches print commands and data from the host unit via a parallel I/F adapter, and executes desired processing of the printer.

A read-only memory (ROM-P) stores a printer control program corresponding to a printer control sequence to be executed by the CPU-P, print font data, and other data.

A timer (TIMER-P) controls the driving times of the feed motor (FM), a heater for performing temperature control of the head, and the like in the printer unit.

An independent real-time clock (RTC-P) in the printer unit is operated by an exclusive battery when the main power supply of the entire system is turned off.

The compound control unit is a unit constituted by a one-chip LSI obtained by integrating a parallel I/F adapter, an IF data take-in controller, a printer port controller, a head & motor controller, a mode controller, a printer control & status port unit, a RAM access control unit, a RAM refresh controller, and the like. The compound control unit will be described in detail later with reference to FIG. 10.

The above-mentioned units are connected to the bus of the CPU-P.

A dynamic RAM (RAM-P) has a data buffer (IB) for temporarily storing print data and commands sent from the parallel I/F adapter, a print buffer (PB) for storing print-developed dot data for one line, and a work area used upon execution of a program. The RAM-P is connected to the compound control unit via a RAM-bus.

As driver circuits for the printer, a CM driver circuit for driving the carriage motor, an FM driver circuit for driving the feed motor, a head driver circuit for driving the recording head, and a heater driver for driving a heater are arranged.

As power saving control circuits, switches SW1 and SW2 for turning on/off the power supply of a Vcc system in accordance with signals Vcc1P-off and Vcc2P-off, and a printer DC/DC for outputting/stopping a power supply voltage Vp to be supplied to the printer driver circuits in accordance with a signal Vp-off are arranged.

An operation panel includes an LED for informing a driving state of the printer to a user, a printer ON/OFF switch (SW) for turning on/off the printer, and panel switches for switching between ONLINE and OFFLINE modes, and for a paper feed operation.

Figure 10:
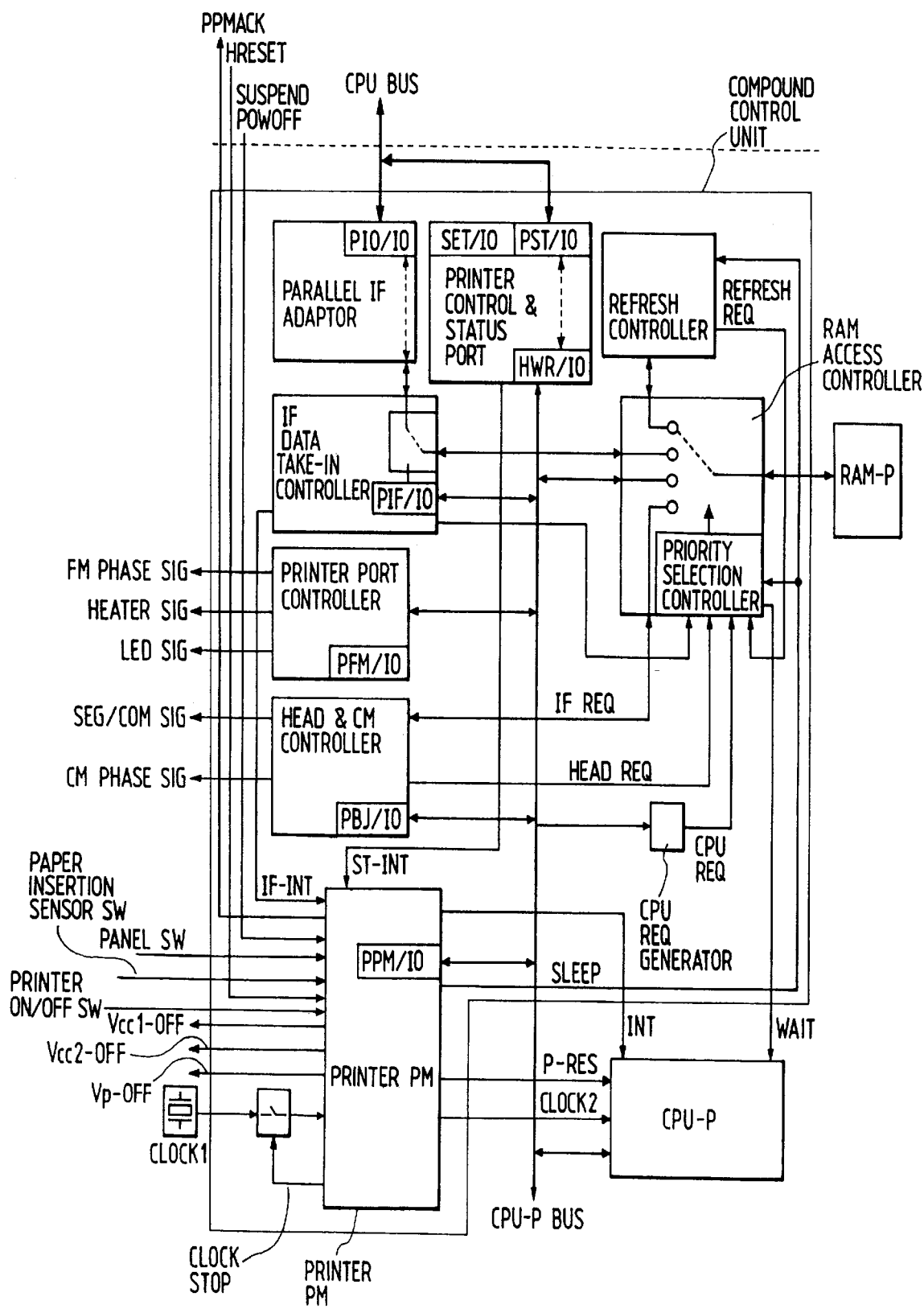
FIG. 10 is an internal block diagram of a compound control unit.

FIG. 10 shows in detail the internal arrangement of the compound control unit.

The parallel I/F adapter is a block for sending print data and commands to the printer unit via the PIO/IO register set in an I/O area of the host unit connected to the CPU-bus.

The printer control & status port unit is a block having a function of exchanging status information and emulation setting information between the printer unit and the host unit via the PST/IO and HWR/IO registers, and a function for setting up registers based on the contents of the SET/IO register. The IF data take-in controller is a block for storing print data and commands in the data buffer (IB) area on the RAM-P via the PIO/IO register of the parallel I/F adapter.

The refresh controller is a block for generating a D-RAM refresh signal for the RAM-P.

The HEAD & CM controller is a block for reading out dot-developed data from the print buffer (PB) area on the RAM-P, and generating a phase signal of the carrier motor (CM) while generating a head driving signal in synchronism with the phase signal.

The printer port controller is a block for outputting signals for driving the feed motor (FM), a head heater, the LED, and the like.

The RAM access controller is a block for managing access rights to the RAM-P in the order of priority levels for four memory access requests from the IF data take-in controller, the refresh controller, the HEAD & CM controller, and the CPU-P. When an access from the CPU-P contends with another access, the CPU-P is waited using a signal WAIT.

A printer power management (printer PM) unit is a block for managing power saving control signals of the printer unit independently from the host unit. The printer PM unit exchanges four signals, i.e., signals SUSPEND, POWOFF, PPMACK, and HRESET with the host PM unit for internal control of the printer unit. The printer PM unit has a function of outputting a power supply control signal (Vcc1P-off) for the CPU-P and the RAM-P, a power supply control signal (Vcc2P-off) for the ROM-P, the TIMER-P, and the RTC-P, and a power supply control signal (Vp-off) for the driver circuits in the printer driving system, and a function for controlling supply of clocks (clock1 and clock2) to the CPU-P. Furthermore, the printer PM unit has input ports for operation panel switches and a paper insertion sensor, and an output port for driving the LED on the operation panel. The printer PM unit will be described in detail later with reference to FIG. 19.

Figure 11:
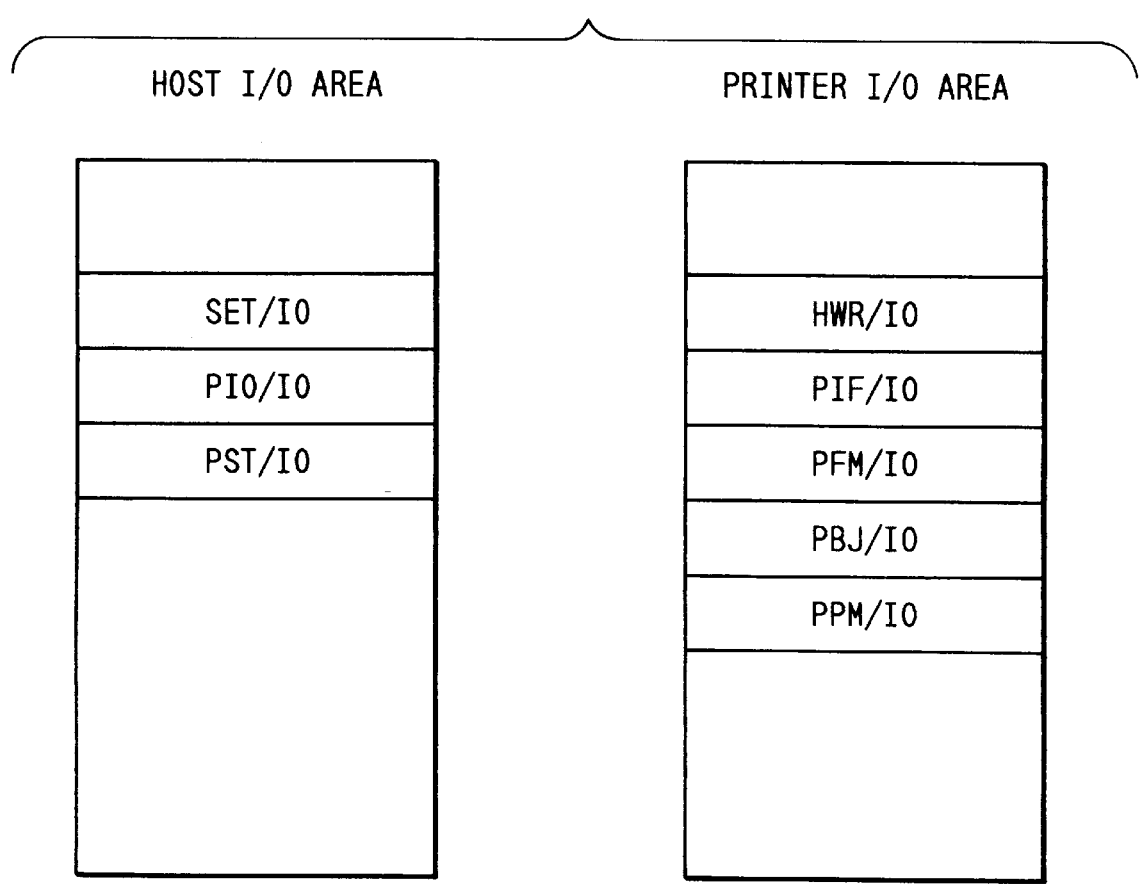
FIG. 11 shows the I/O maps of the host unit and the printer unit.

FIG. 11 shows the I/O areas of the host unit and the printer unit, which areas are constituted in the compound control unit.

The I/O area of the host unit is an I/O port which is constituted by the above-mentioned SET/IO, PIO/IO, and PST/IO ports, and can be read/write-accessed by the CPU in the host unit.

The I/O area of the printer unit is an I/O port which is constituted by HWR/IO, PIF/IO, PFM/IO, PBJ/IO, and PPM/IO ports, and can be read/write-accessed by the CPU-P in the printer unit.

Figure 12:
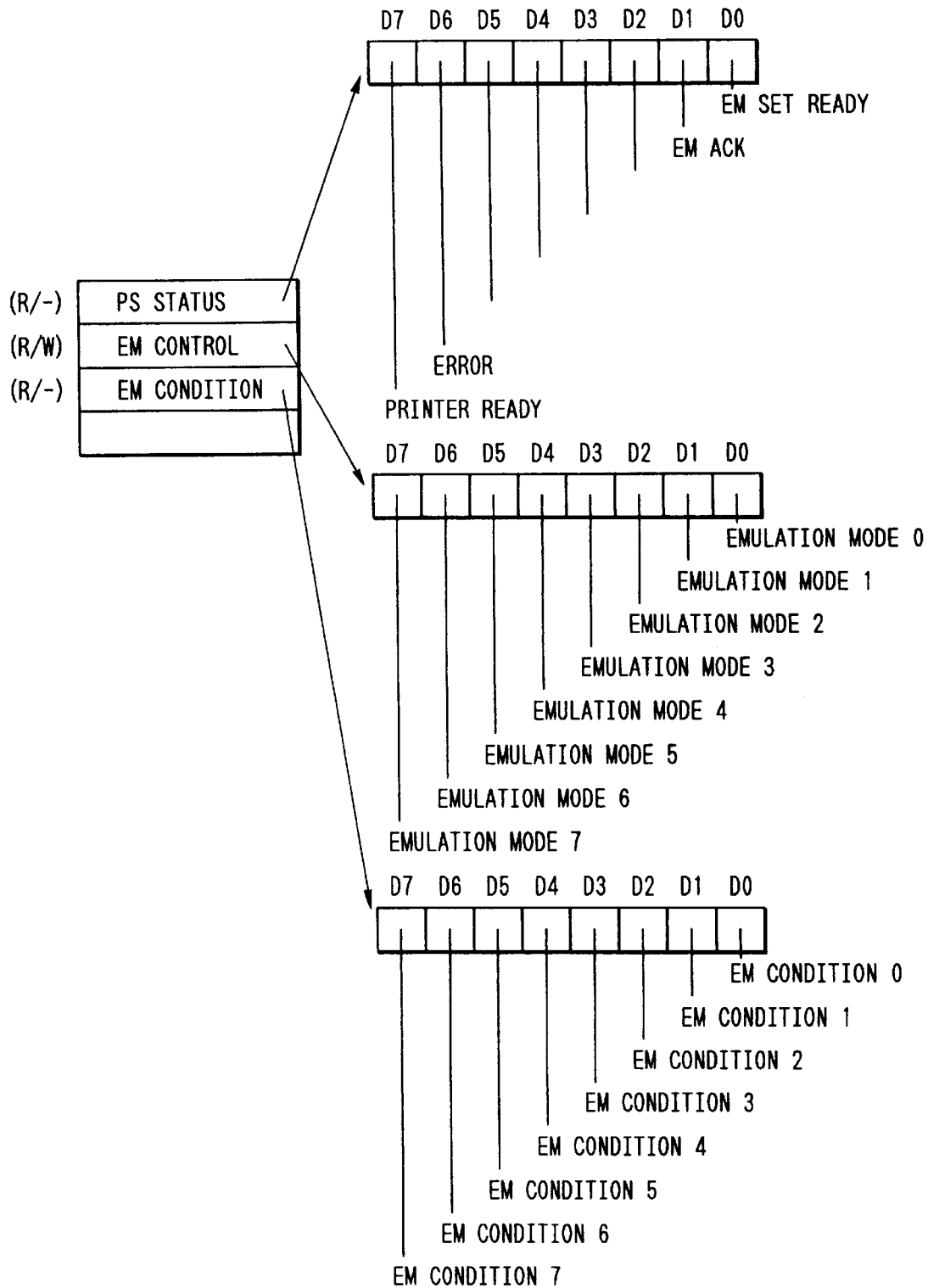
FIG. 12 is a view showing the arrangement of a PST/IO register.

FIG. 12 shows the arrangement of a printer status port (PST/IO) which can be accessed by the host unit. This printer status port is constituted by PS status, EM control, and EM condition registers.

Figure 13:
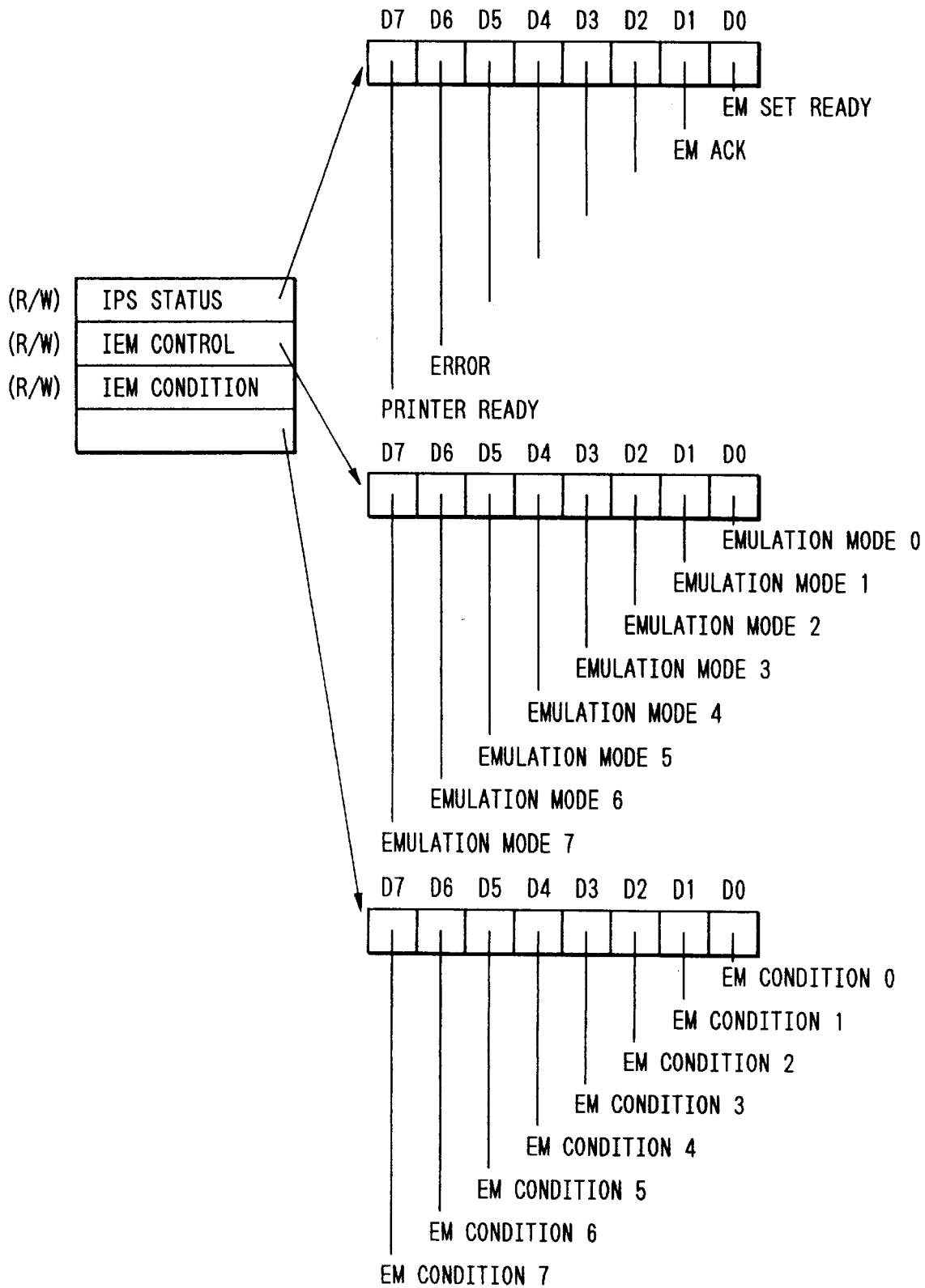
FIG. 13 is a view showing the arrangement of an HWR/IO register.

FIG. 13 shows the arrangement of a printer status port (HWR/IO) which can be accessed by the printer unit. This printer status port is constituted by IPS status, IEM control, and IEM condition registers.

The relationship between the PST/IO register and the HWR/IO register is controlled by the printer control & status port unit as follows.

The IPS status register is a register indicating the operating state or emulation hand-shake state of the printer. Data is written in the IPS status register by the CPU-P in the printer unit. The host unit can confirm the contents of the IPS status register by reading out the contents of the PS status register.

The EM control register and the EM condition register are registers in which data is written by the CPU in the host unit, and which are used for the purpose of setting the printer emulation mode, and changing setting information for each emulation mode. The printer unit can confirm the setting contents of these registers by reading out the contents of the IEM control register and the IEM condition register.

These registers will be described in more detail below. When the CPU of the host unit writes data for changing the printer emulation mode and printer setting information in the EM control register and the EM condition register, an interrupt signal (INT) is generated in the CPU-P in the printer unit. With this interrupt processing, the CPU-P switches the emulation setting state by reading out the written emulation mode from the IEM control register and the IEM condition register. After the emulation mode is switched, the CPU-P interprets data and commands transferred from the parallel I/F port in the changed emulation mode.

In order to inform a change in emulation mode in the printer unit to the host unit, the newly set emulation mode or printer setting information is written in the IEM control register and the IEM condition register. Then, the host unit can confirm the change in emulation mode in the printer unit by reading out the contents of the EM control register and the EM condition register.

An EM set ready bit and an EM acknowledge bit in the PS status register are prepared for the above-mentioned hand-shake processing. The EM set ready bit is a bit for permitting a write access to the EM control register and the EM condition register, and the EM acknowledge bit is a bit indicating that the changing processing in the printer unit has been completed, and the changed status information has been set in the EM control register and the EM condition register.

These bits correspond to a write access from the CPU-P to an IEM set ready bit and an IEM acknowledge bit in the IPS status register.

Figure 14:
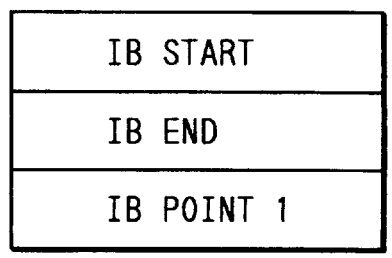
FIG. 14 is a view showing the arrangement of a PIF/IO register.

FIG. 14 shows the arrangement of an I/O register (PIF/IO) in the IF data take-in controller, which register can be read/write-accessed by the CPU-P in the printer unit. This I/O register is constituted by IB start, IB end, and IB point1 registers.

Figure 15:
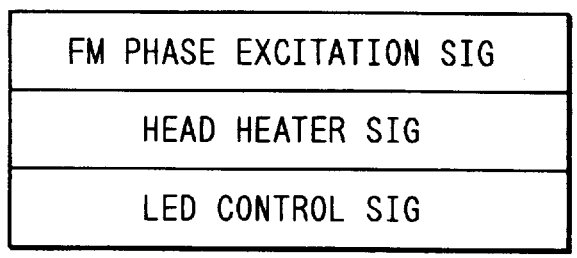
FIG. 15 is a view showing the arrangement of a PFM/IO register.

FIG. 15 shows the arrangement of an I/O register (PFM/IO) in the printer port controller, which register can be read/write-accessed by the CPU-P in the printer unit. This I/O register is constituted by FM phase excitation signal, head heater signal, and LED control signal registers.

Figure 16:
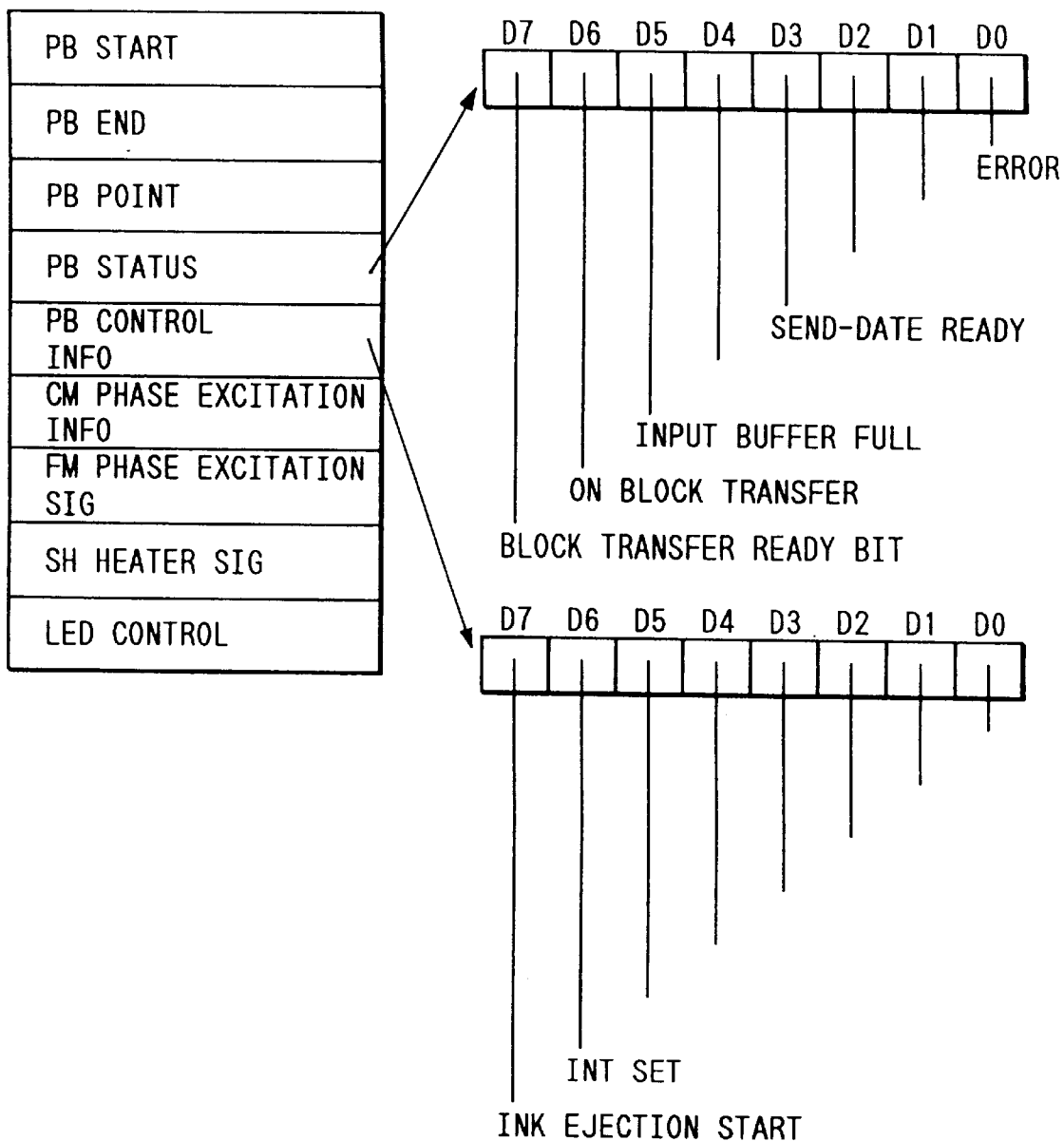
FIG. 16 is a view showing the arrangement of a PBJ/IO register.

FIG. 16 shows the arrangement of an I/O register (PBJ/IO) in the HEAD & CM controller, which register can be read/write-accessed by the CPU-P in the printer unit. This I/O register is constituted by PB start, PB end, PB point, PB status, PB control information, and CM phase excitation signal registers.

Figure 17:
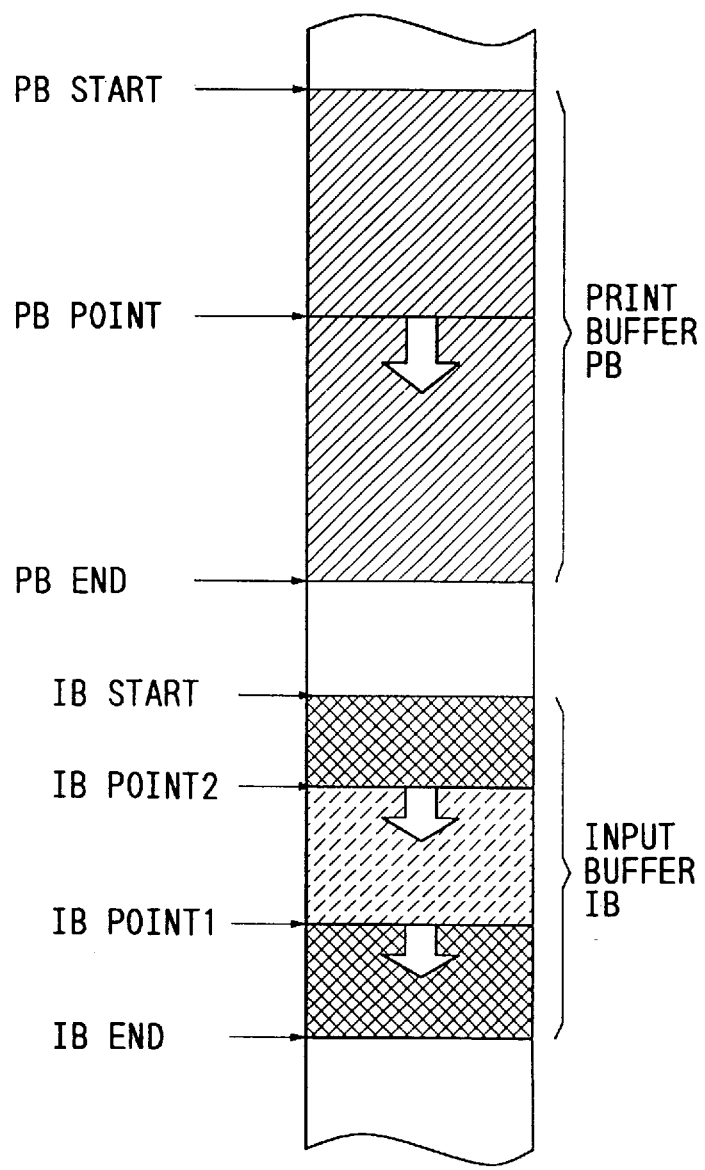
FIG. 17 shows the RAM-P address map of the printer unit.

FIG. 17 shows the address map of the RAM-P. In this address map, memory areas for a print buffer (PB) managed by the CPU-P, and a reception buffer (IB) managed by the IF data take-in controller are assigned.

The reception buffer (IB) area is used for setting a data area required for data reception. This area is set using the PIF/IO register. The start address (IB start) and the end address (IB end) in the IF data take-in controller are set, data (IF data) sent from the host unit are written on the RAM-P in turn from the start address to the end address, and when the end address is reached, the write operation is continuously performed by returning the write address to the start address again. A pointer (IB point1) during data reception indicates the address of data which has been already taken in, and is written latest. A pointer (IB point2) indicates the address from which data has been read out.

The print buffer (PB) area is used for setting an area for dot data necessary for a print operation. This area is set using the PBJ/IO register. The start address (PB start) and the end address (PB end) in the printer unit are set, print data are read out from the RAM-P in turn from the start address from the end address, and the print operation is performed by supplying a control signal to the head driver. A print data address pointer (PB point) during the print operation indicates the address of data which is being output.

With the above-mentioned control, the CPU-P of the printer unit reads out received data from the IB area, develops the received data into print data, and writes the print data in the PB area. Thereafter, the CPU-P can leave other processing during the print operation to the compound control unit.

Figure 18:
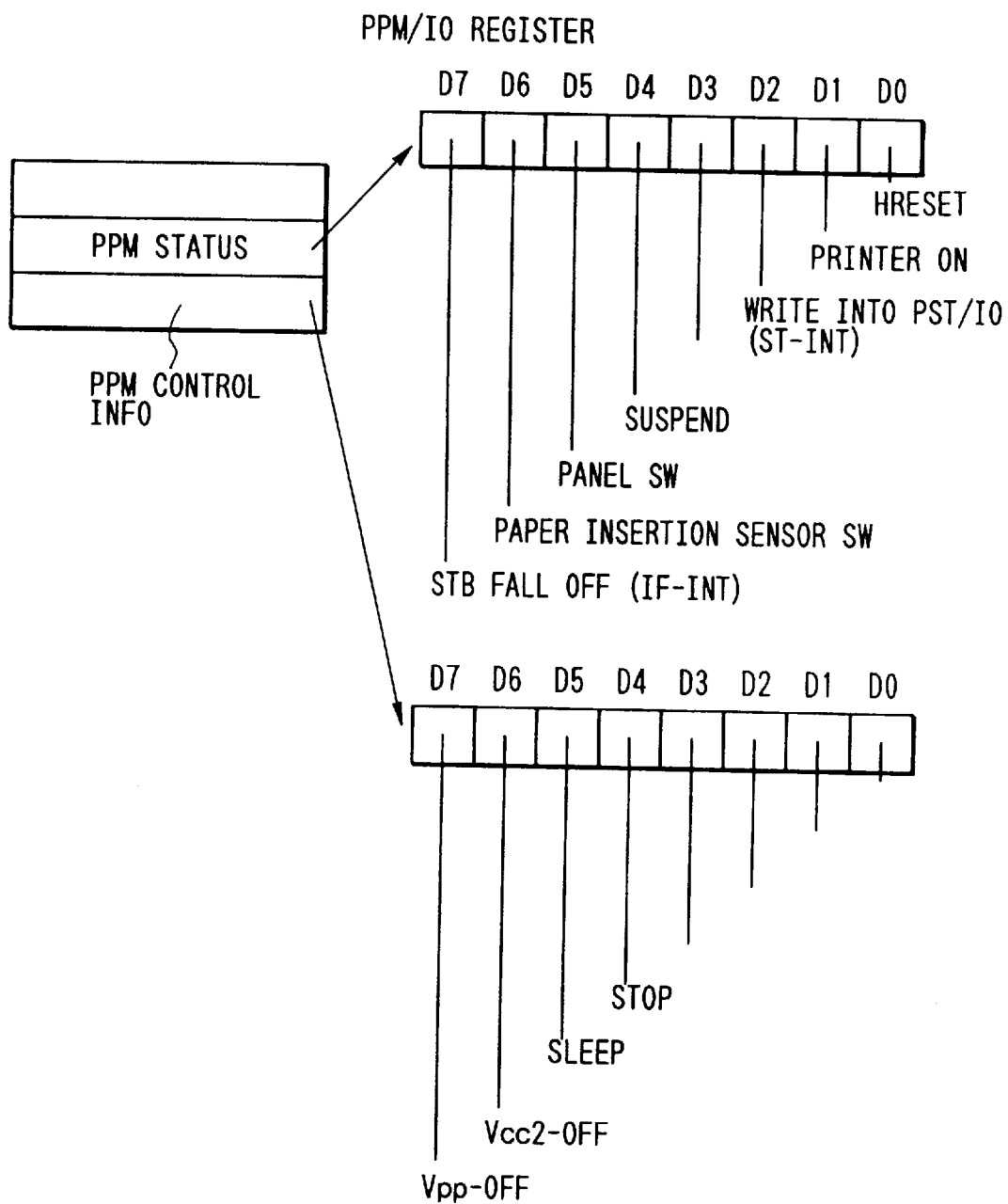
FIG. 18 is a view showing the arrangement of a PPM/IO register.

FIG. 18 shows the arrangement of an I/O register (PPM/IO) in the printer PM unit, which register can be read/write-accessed by the CPU-P in the printer unit. This I/O register is constituted by PPM status and PPM control information registers.

Figure 19:
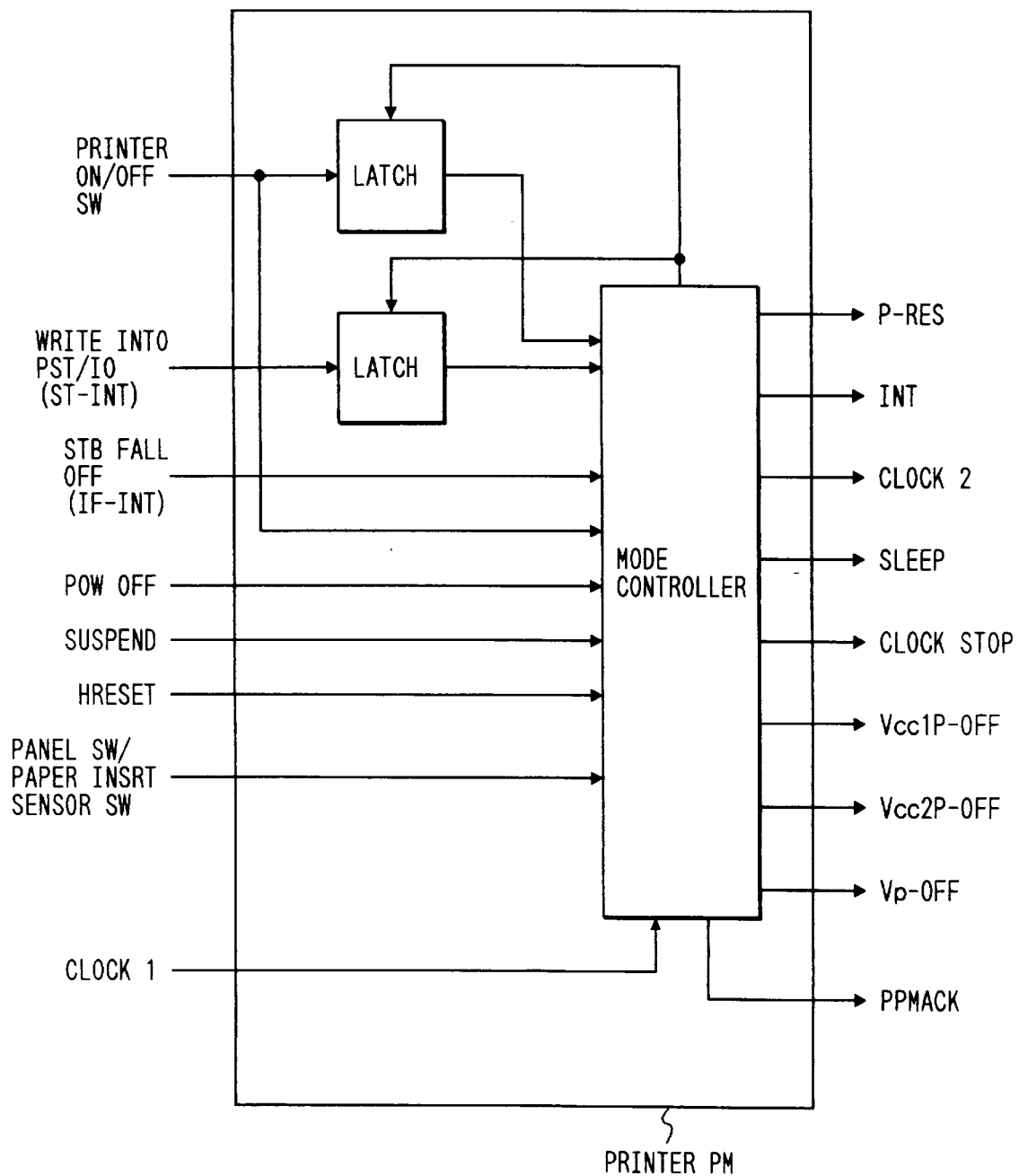
FIG. 19 is a diagram showing a printer PM unit.

FIG. 19 shows the internal arrangement of the printer PM unit.

As a Printer ON/OFF switch input, a latch signal obtained via a Printer OFF signal latch circuit and a direct Printer ON/OFF SW signal are supplied to the mode controller.

A write signal (ST-INT) to the PST/IO register is supplied to the mode controller as a latch signal via a PST/IO write latch circuit.

An STB fall off signal (IF-INT) is a signal for informing that print data and commands are sent when the printer is set in a sleep mode, and a fall off signal of the STB bit of the parallel control port of the PIO/IO register is sent to the mode controller.

A clock clock1 corresponds to an original oscillation input of a system clock for operating the CPU-P, and is directly output as a clock clock2 in a normal operation.

A panel SW/paper insertion sensor SW signal is a signal used for a feed switch and a paper insertion sensor arranged on the panel of the printer.

The remaining inputs to the mode controller are signals directly input from the host unit, and include a hard reset (HRESET) signal used when the system power supply is started, a signal SUSPEND indicating a suspend/resume state as a power saving mode of the host PM unit, and a signal POWOFF indicating a power OFF request. When the signal POWOFF is output, the power supply of the host unit is ready to be turned off, and the respective devices (the CPU, RAM, and the like) are set in a standby state in which they are ready for the power OFF operation.

A mode transition system (to be described later) is realized by output control of signals P-RES, clock2, Sleep, clock-stop, and the like in accordance with these signals and a SLEEP/STOP setting condition of the PPM/IO register under the control of the CPU-P.

The P-RES output is a signal for resetting the CPU-P.

An INT output is a hardware interrupt signal to the CPU-P, i.e., a signal for resuming the CPU-P itself from the sleep state. In the non-suspend state of the host unit, the INT output is generated in response to the signal ST-INT, the signal IF-INT, the panel SW/paper insertion sensor SW signal, and the like. Also, the INT output is generated when the CPU-P is resumed from the suspend state from the host unit, and no printer OFF latch signal is available.

The clock2 output is a system clock for operating the CPU-P and is a control signal for stopping the clock so as to set a HALT state, delaying the clock to eliminate power consumption, and so on.

The Sleep output is a signal sent to the Refresh controller to switch a Sleep/Refresh mode, and allows holding of the contents of the RAM-P in the power saving state in the sleep mode.

The clock-stop output is a signal for further lowering a consumption current of the printer PM unit by stopping oscillation of the clock1 when the CPU-P is set in the HALT state.

The outputs Vcc1P-off, Vcc2P-off, and Vp-off are power supply control signals for stopping power supply to unnecessary circuits in correspondence with the power saving mode, and control the power supply control signal (Vcc1P-off) for the CPU-P and the RAM-P, the power supply control signal (Vcc2P-off) for the ROM-P, TIMER1-P, and RTC-P, and the power supply control signal (Vp-off) of the driver circuits in the printer driving system.

When the host PM unit issues the power OFF request (POWOFF), and the printer is executing a print operation, the power supply cannot be turned off until the head of the printer is returned to the home position. During this interval, the PPMACK output controls not to turn off the main power supply until the signal PPMACK goes to "1", thereby delaying the power OFF operation of the host PM unit.

The power OFF sequences of the printer PM unit and the host PM unit can be directly performed by the PM controller using the signals POWOFF and PPMACK without executing data hand-shake processing via the I/O ports of the CPU of the host unit and the CPU-P of the printer unit. Thus, the load on the host CPU can be eliminated.

The power OFF sequence will be described in detail below with reference to FIG. 21.

Figure 21:
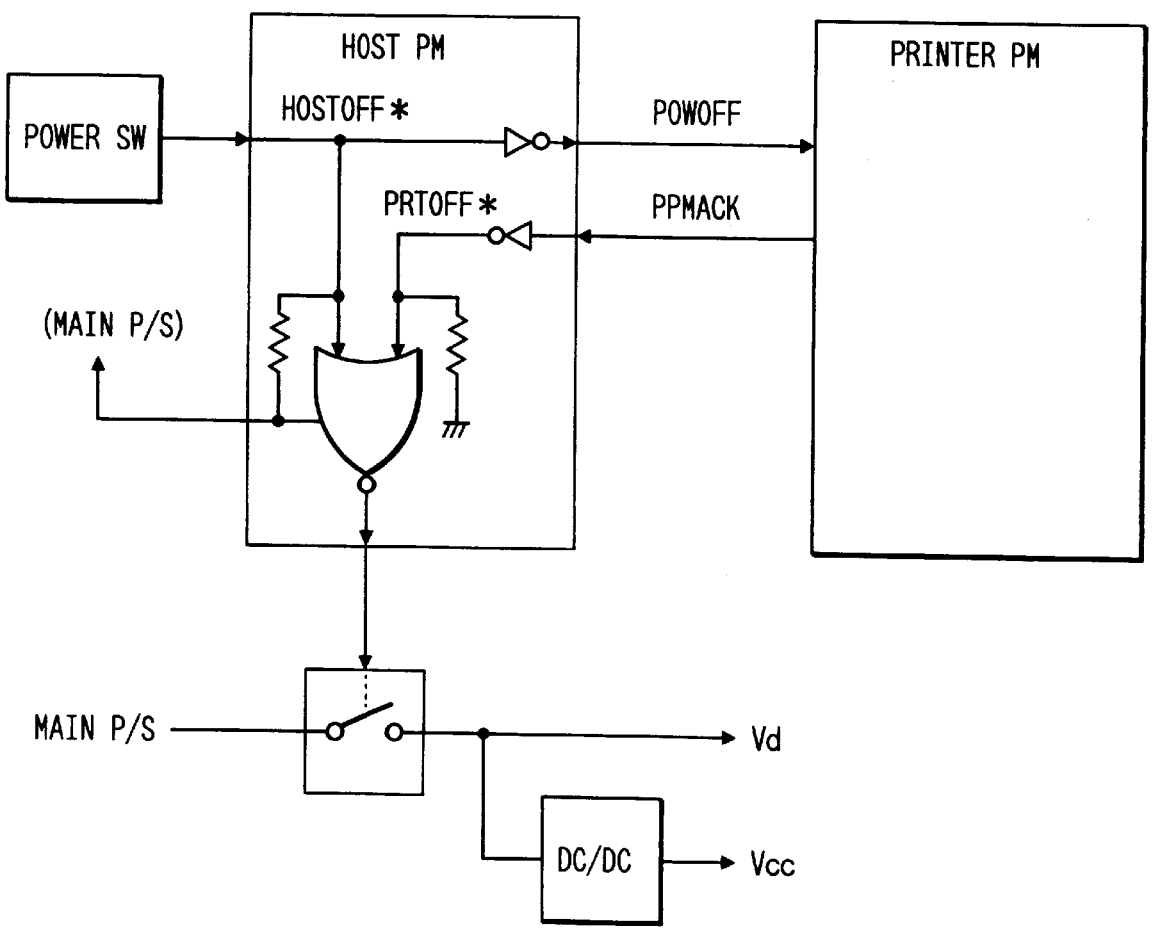
FIG. 21 is a diagram showing the power OFF sequence of a host PM unit.

FIG. 21 is a diagram showing the power OFF sequence of the host PM unit.

When the power switch of the main body is turned off, a signal HOSTOFF* goes to "0" level, and a signal POWOFF obtained by inverting the signal HOSTOFF* is output from the host PM unit to the printer unit as a power OFF request signal.

The printer unit supplies a signal PPMACK indicating that the printer is in a standby state to the host PM unit, and an inverted signal of the signal PPMACK serves as a signal PRTOFF*.

When the printer has already been set in a standby state, since the signal PPMACK is kept set at "1", the signal PRTOFF* is "0". In this case, when the signal HOSTOFF* goes to "0" level, the power supply Vd is turned off.

On the other hand, when the printer is executing a print operation, and the head is not returned to the home position, since the signal PPMACK is "0", the signal PRTOFF* is "1". During this interval, supply of the power supply Vd is continued. When the printer is set in a standby state, since the signal PPMACK from the printer PM unit changes to "1", the signal PRTOFF* changes to "1", and the power supply Vd is turned off.

More specifically, when both the signals HOSTOFF* and PRTOFF* go to "0", the power supply Vd is turned off.

Furthermore, in a power ON state, since the signal PRTOFF* is pulled down, and the signal HOSTOFF* is pulled up by the main power supply, the signal HOSTOFF* goes to "1" level when the power switch is turned on, and the main power supply is connected to the power supply Vd.

Figure 20:
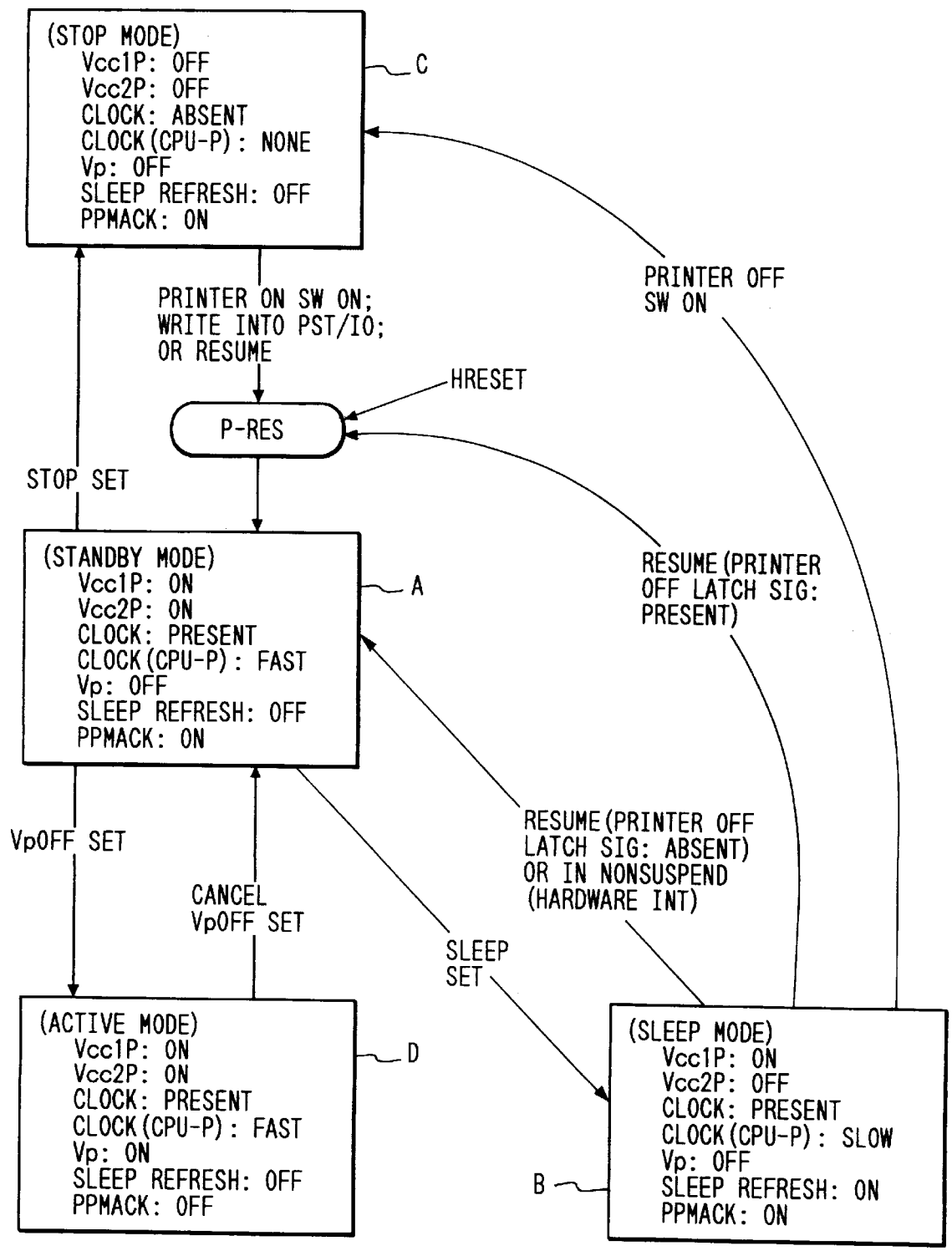
FIG. 20 is a chart showing a transition state of power management.

FIG. 20 shows a change in state of the printer unit by the printer PM unit in correspondence with respective conditions.

State A is called a standby mode. In this mode, all logic systems are active except that the power supply of the printer driving unit is turned off, and a print operation mode can be quickly started from this mode.

State B is called a sleep mode, i.e., a low power consumption standby mode in which only the power supply Vcc1P of the logic systems is ON, and only the register contents of the CPU-P and the memory contents of the RAM-P are held.

State C is called a stop mode. In this mode, all the operations of the printer unit are stopped, and initialization using the signal P-RES is required to change this mode to the standby mode.

State D is called an active mode. In this mode, when the power supply of the printer driving unit is turned on in the standby mode, the print operation is allowed. Since the signal PPMACK is set in an off state ("0") in this mode, when a POWOFF request is generated, the main power supply is controlled not to be turned off until state A is resumed.

Upon generation of the signal HRESET synchronized with the initializing operation of the host unit, the printer PM unit is set in state A. Thereafter, when the Sleep mode is set in the PPM/IO register, the printer PM unit is set in state B. Furthermore, when the Stop mode is set, the state of the printer PM unit is changed to state C.

Changes in state A (standby mode) include three different changes, i.e., a change of A→B upon setting of the Sleep mode by the CPU-P, a change of A→C upon setting of the Stop mode by the CPU-P, and a change of A→D upon setting of the Vp-off mode by the CPU-P.

Changes in state B (sleep mode) include three different changes, i.e., a change of B→A upon generation of the hardware interrupt INT (paper insertion, operation SW, STB fall off, write access to PST-IO, and the like) or by a RESUME operation performed when the signal SUSPEND is changed to a non-suspend state, a change of B→C upon generation of the Printer OFF SW input, and a change to state A via initialization by the signal P-RES in a RESUME operation with the Printer OFF latch signal.

A change in state C (stop mode) is a change to state A via initialization by the signal P-RES. This change occurs when a write access to the PST/IO register is made, and when a RESUME operation is generated by switching the signal SUSPEND to the non-suspend state.

A change in state D (active mode) is only a change to state A when the CPU-P cancels the Vp-off setting state.

According to the present invention, since exchange of printer status information and emulation mode setting information, and transfer of print commands and print data are performed via the registers (PIO/IO and PST/IO) allocated in the printer unit, the relationship between the host unit and the printer unit can be controlled in the same manner as the relationship between a host computer and a normally used printer externally connected to the host computer. Therefore, a change in emulation mode and high-speed data transfer can be realized without impairing versatility of system devices.

Furthermore, in the internal printer unit assembled in the personal computer, since a print control function, an interface control function, and a power saving control function are realized by a single independent unit, a space for components in a system as a combination of the host computer unit and the printer unit can be saved.

On the other hand, in the personal computer which incorporates the printer, independent power saving control of the printer unit synchronized with power saving control of the host computer unit can be realized.

What is claimed is:

1. An information processing apparatus comprising:
    host control means for controlling said information processing apparatus, said host control means placing said information processing apparatus in a power-on state and a power-off state in response to input of a power-on signal and a power-off signal, respectively; and
    printer control means for controlling a printer, said printer control means sending to said host control means a printer-operating signal indicating that the printer is in a printing state or a printer-standby signal indicating that the printer is in a standby state according to a printer state,
    wherein said host control means sends a power-off request signal to said printer control means in response to input of the power-off signal,
    wherein said printer control means sends to said host control means the printer-operating signal or the printer-standby signal in response to a power-off request signal from said host control means,
    wherein said host control means does not place said information processing apparatus in the power-off state if the power-off signal is input and if the printer-operating signal is received from said printer control means,
    wherein said host control means places said information processing apparatus in the power-off state if the power-off signal is input and if the printer-standby signal is received from said printer control means, and
    wherein said host control means places said information processing apparatus in the power-on state if the power-on signal is input, irrespective of the printer operating signal or the printer-standby signal being received from said printer control means.

2. An apparatus according to claim 1, further comprising a keyboard and a display.

3. An apparatus according to claim 1, wherein the printer controlled by said printer control means includes a head and a carriage for mounting the head.

4. An apparatus according to claim 1, wherein said printer control means controls the printer to shift between an active mode, a ready mode, a sleep mode, and a stop mode.

5. An apparatus according to claim 1, wherein said host control means has an OR circuit for executing an OR operation between the power-off signal or the power-on signal and the printer-operating signal or the printer-standby signal to obtain an OR output signal, and places said information processing apparatus in the power-on state or in the power-off state in response to the OR output signal.

6. An apparatus according to claim 1, further comprising a power-off switch for inputting the power-off signal.

7. An apparatus according to claim 1, further comprising a printer power-off switch for placing the printer in a power-off state.

8. A method carried out in an information processing apparatus including host control means for controlling the information processing apparatus, the host control means placing the information processing apparatus in a power-on state and a power-off state in response to input of a power-on signal and a power-off signal, respectively, and printer control means for controlling a printer, the printer control means sending to the host control means a printer-operating signal indicating that the printer is in a printing state or a printer-standby signal indicating that the printer is in a standby state according to a printer state, said method comprising the steps of:
    controlling the host control means to send a power-off request signal to the printer control means in response to input of the power-off signal;
    controlling the printer control means to send to the host control means the printer-operating signal or the printer-standby signal in response to the power-off request signal from the host control means;
    controlling the host control means not to place the information processing apparatus in the power-off state if the power-off signal is input and if the printer-operating signal is received from the printer control means;
    controlling the host control means to place the information processing apparatus in the power-off state if the power-off signal is input and if the printer-standby signal is received from the printer control means; and controlling the host control means to place the information processing apparatus in the power-on state if the power-on signal is input, irrespective of the printer-operating signal or the printer-standby signal being received from the printer control means.

9. User A method according to claim 8, further comprising the steps of:

executing an OR operation between the power-off signal or the power-on signal and the printer-operating signal or the printer-standby signal to obtain an OR output signal; and placing the information processing apparatus in the power-on state or in the power-off state in response to the OR output signal.

10. A method according to claim 8, further comprising the step of inputting the power-off signal to the host control means using a power-off switch.

11. A method according to claim 10, further comprising the step of placing the printer in a power-off state using a printer power-off switch.

* * * * *

UNITED STATES PATENT AND TRADEMARK OFFICE
CERTIFICATE OF CORRECTION

PATENT NO. : 5,844,813

DATED : December 1, 1998

INVENTOR(S) : JIRO TATEYAMA                                  Page 1 of 3

It is certified that error appears in the above-identified patent and that said Letters Patent is hereby corrected as shown below:

On the title page item [54], and column 1, line 2,

"POWER" should read --POWER- --.

At [56] References Cited

"Mere" should read --Mese--; and
"Iheda" should read --Ikeda--.

Column 1

Line 2, "POWER" should read --POWER- --.

Column 2

Line 8, "like" should read --as--.

UNITED STATES PATENT AND TRADEMARK OFFICE
CERTIFICATE OF CORRECTION

PATENT NO. : 5,844,813

DATED : December 1, 1998

INVENTOR(S) : JIRO TATEYAMA

It is certified that error appears in the above-identified patent and that said Letters Patent is hereby corrected as shown below:

Column 6

Line 42, "shows" should read --show--; and
    Line 51, "104H" should read --104H,--.

Column 7

Line 35, "is a timing chart" should read
--are timing charts--.

Column 8

Line 45, "The IF" should read --¶The IF--; and
    Line 64, "waited" should read --made to wait--.

Column 10

Line 54, "from" should read --to--.

UNITED STATES PATENT AND TRADEMARK OFFICE
CERTIFICATE OF CORRECTION

PATENT NO.    : 5,844,813

DATED         : December 1, 1998

INVENTOR(S) : JIRO TATEYAMA

It is certified that error appears in the above-identified patent and that said Letters Patent is hereby corrected as shown below:

<u>COLUMN 15</u>

Line 6, "User" should be deleted.

Signed and Sealed this

Twenty-eighth Day of November, 2000

Attest:

Q. TODD DICKINSON

*Attesting Officer*       *Director of Patents and Trademarks*